(12) United States Patent
Sugita

(10) Patent No.: US 6,201,596 B1
(45) Date of Patent: Mar. 13, 2001

(54) EXPOSURE METHOD AND DEVICE

(75) Inventor: Yukio Sugita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/189,935

(22) Filed: Nov. 12, 1998

(30) Foreign Application Priority Data

Nov. 11, 1997 (JP) .................................................. 9-308549

(51) Int. Cl.$^7$ ............................... G03B 27/52; B41J 2/47
(52) U.S. Cl. .............................. 355/41; 355/40; 347/238
(58) Field of Search .................................. 355/32, 35, 67, 355/70, 40, 41, 27–29; 347/238, 241, 242

(56) References Cited

U.S. PATENT DOCUMENTS

| 4,931,815 | * | 6/1990 | Sato et al. | 346/154 |
| 5,717,451 | * | 2/1998 | Katano et al. | 347/242 |
| 5,959,654 | * | 9/1999 | Yoshida | 347/238 |
| 6,023,537 | * | 2/2000 | Wada et al. | 382/312 |
| 6,031,558 | * | 2/2000 | Hattori et al. | 347/238 |
| 6,035,076 | * | 3/2000 | Nagase | 382/294 |

* cited by examiner

*Primary Examiner*—Russell Adams
*Assistant Examiner*—Hung Henry Nguyen
(74) *Attorney, Agent, or Firm*—Sughrue, Mion, Zinn, Macpeak & Seas, PLLC

(57) ABSTRACT

A positional error of each of a plurality of LED chips mounted in a light source portion along a predetermined direction is measured in advance and stored in a look-up table. When exposure is effected by the LED chips, in a sample-and-hold circuit formed by an analog switch, a capacitor, and a buffer amplifier, the timing at which the analog switch is switched on is displaced for each of analog switches corresponding to the LED chips in accordance with positional errors of the mounted LED chips so that exposure positions obtained by the LED chips are arranged on the same straight line along the predetermined direction.

22 Claims, 9 Drawing Sheets

F I G. 1
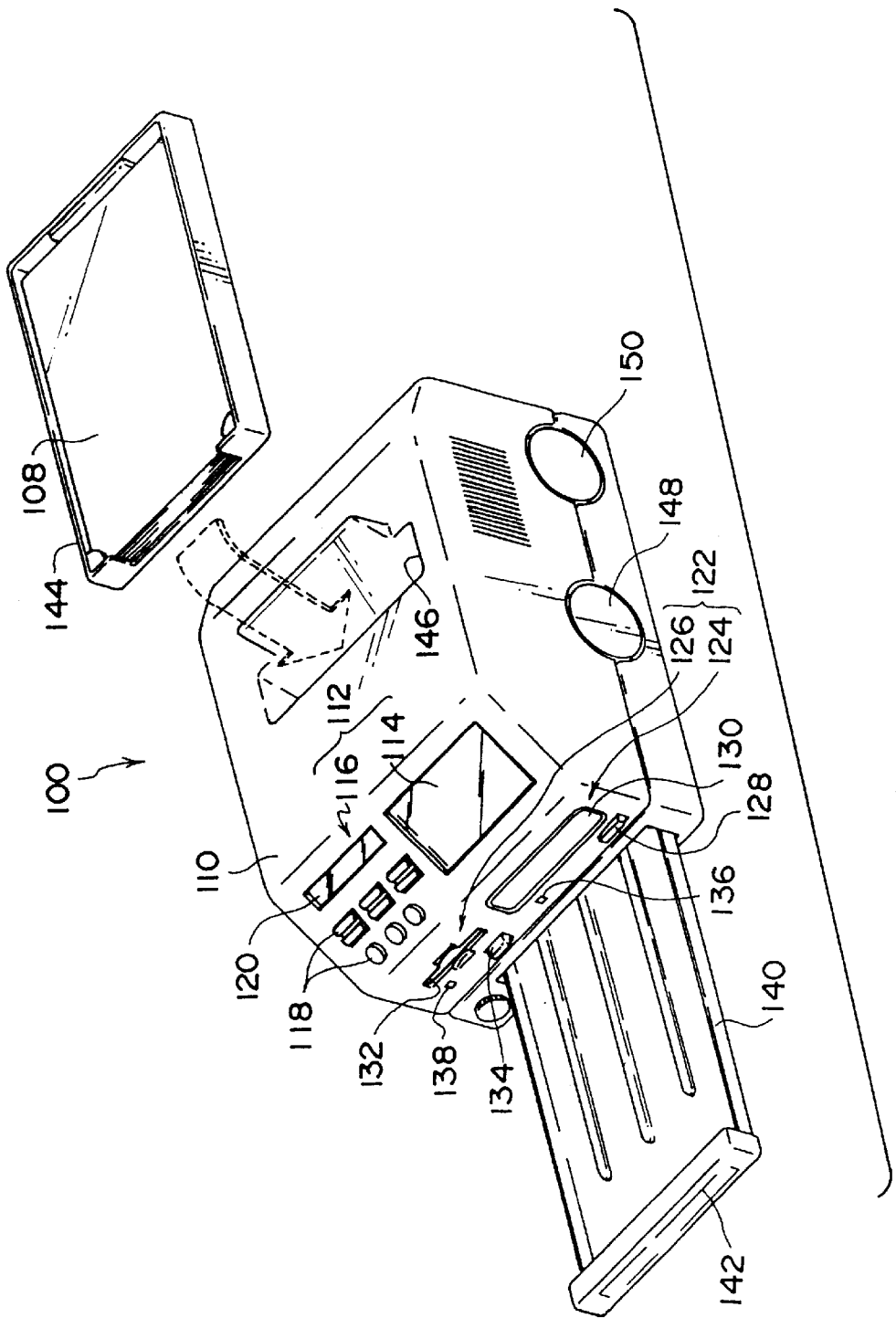

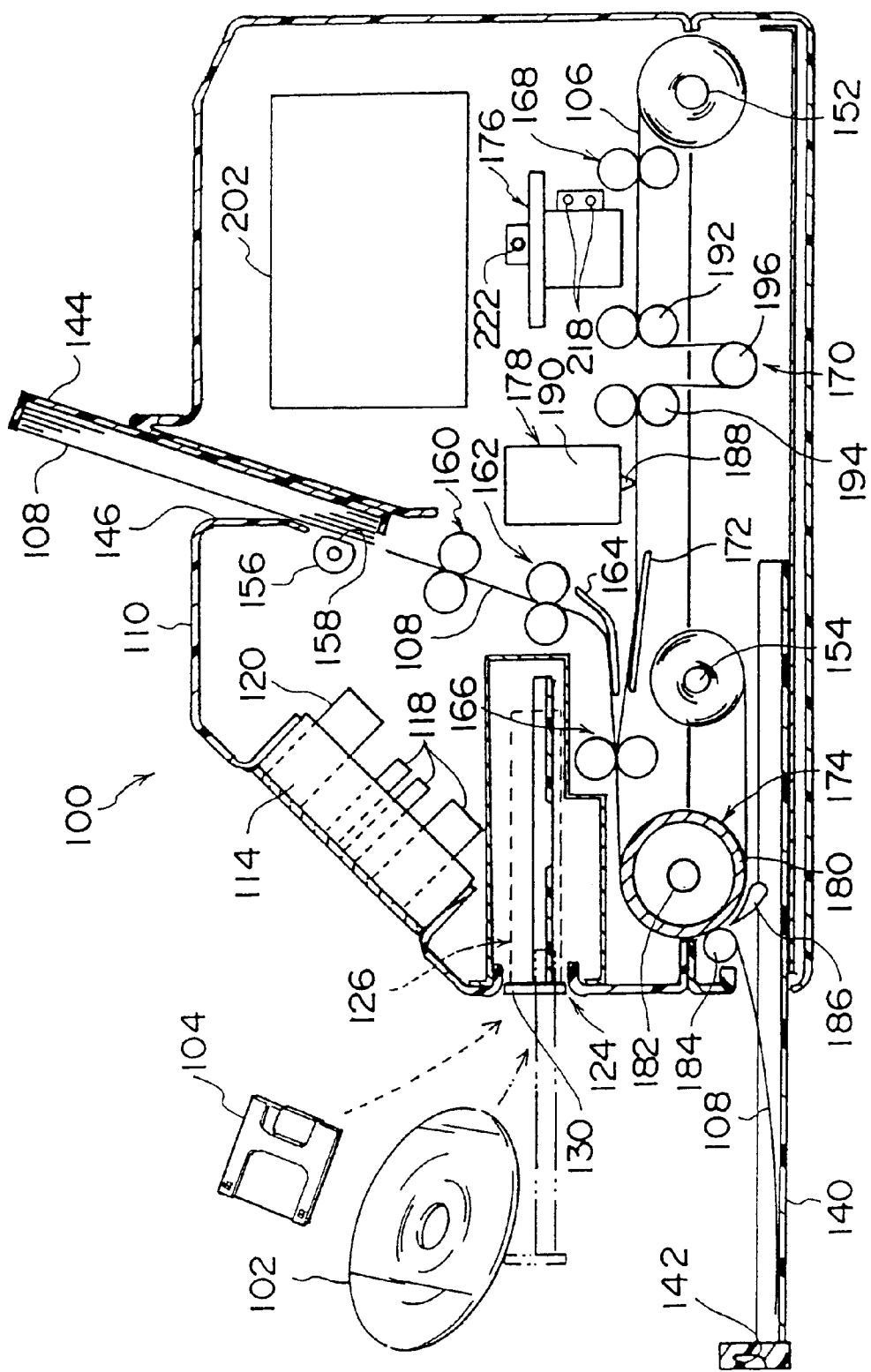
F I G. 3

F I G. 5
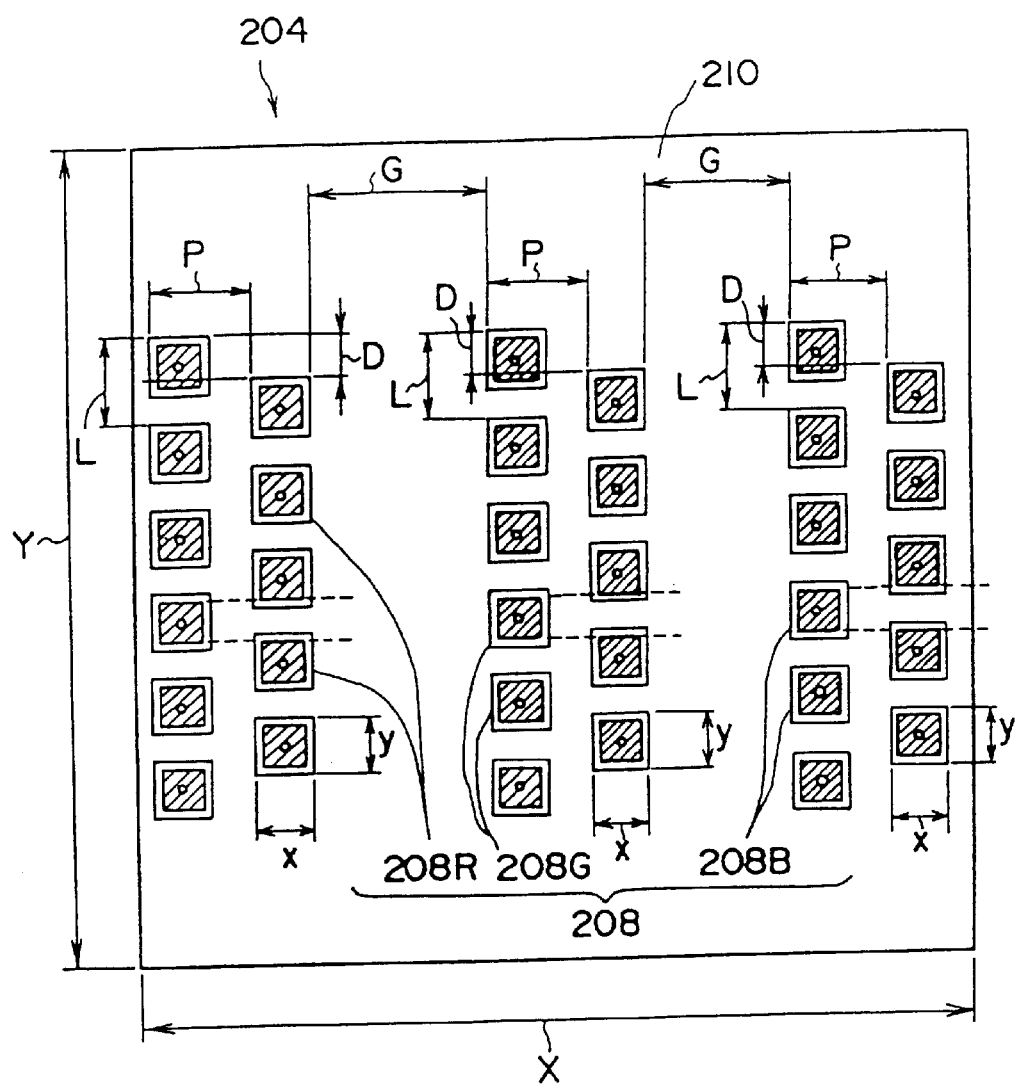

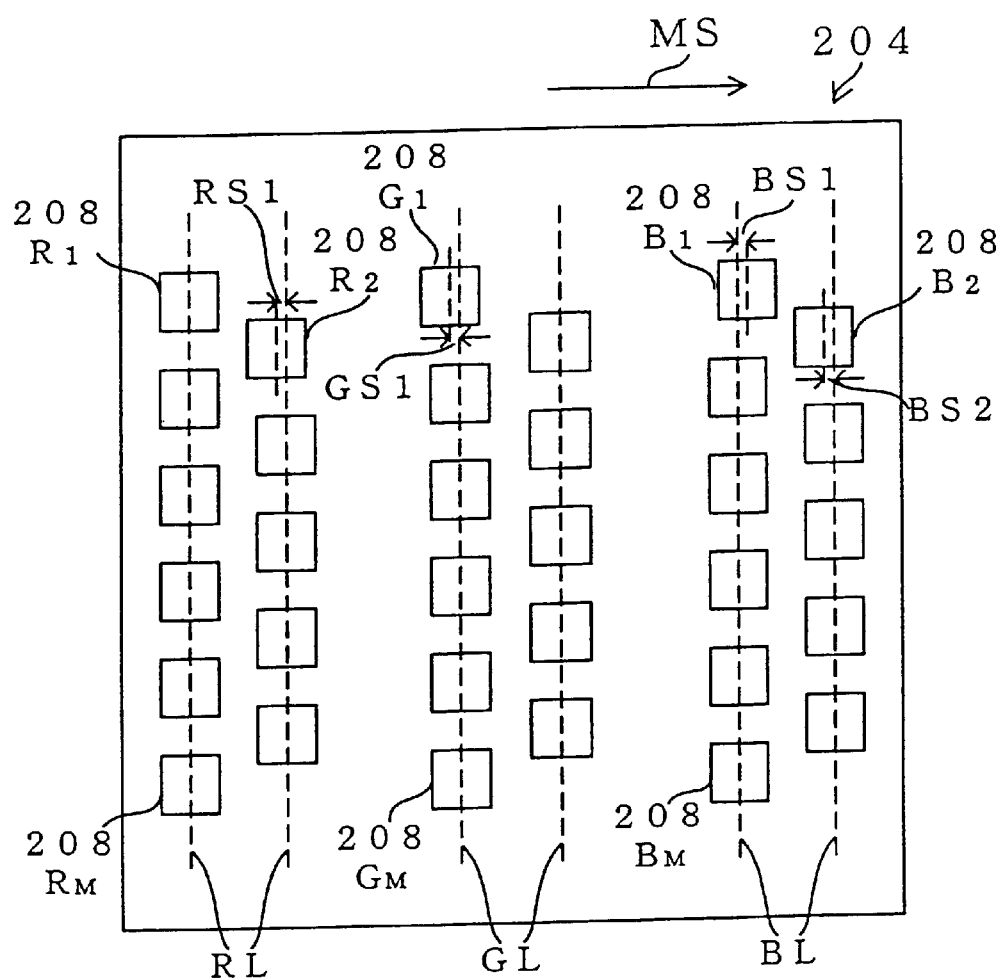
F I G. 8

EXPOSURE METHOD AND DEVICE

BACKGROUND OF THE INVENTION

1. Field of the Invention

The present invention relates to an exposure method and device, and particularly to an exposure method and device which effects exposure by light emitting elements such as LED chips or laser diode (LD).

2. Description of the Related Art

Conventionally, in an image recording apparatus such as a printer, in which an image is exposed onto a photosensitive material based on image data and an image recorded by the exposure on the photosensitive material is transferred to a plain paper and is outputted, an exposure device is used in which light emitting elements such as LED chips or LD, which are used for exposure of the photosensitive material, are provided in a light source portion.

In such conventional image recording apparatus, in order to allow high-speed recording of an image on a photosensitive material, a plurality of light emitting elements are provided in a light source portion along a sub-scan direction and a plurality of scanning lines are simultaneously formed in the sub-scan direction at one main scan operation, thereby allowing recording of an image.

In the above-described conventional image recording apparatus having a plurality of light emitting elements, it is necessary that the plurality of light emitting elements be mounted correctly to predetermined positions along a sub-scan direction of the light source portion so that exposure positions of the plurality of light emitting elements on the photosensitive material, which are provided along the sub-scan direction, are arranged on the same straight line along the sub-scan direction. However, these light emitting elements are not necessarily mounted to correct positions due to positional errors of mounted light emitting elements in a production process of the light source portion or due to displacement of the mounted positions of the light emitting elements caused by environmental variation after the production, or the like.

When the plurality of light emitting elements are not mounted to correct positions in the light source portion, these light emitting elements cannot be caused to emit light so that exposure positions of the light emitting elements on the photosensitive material are arranged on the same straight line along the sub-scan direction. As a result, there exists a drawback in that the quality of an image obtained finally deteriorates.

SUMMARY OF THE INVENTION

The present invention has been devised so as to solve the above-described drawback, and an object thereof is to provide an exposure method and device which can prevent deterioration in the quality of an image, which is caused by positional errors of mounted light emitting elements.

A first aspect of the present invention is an exposure device comprising: a light source portion in which a plurality of light emitting elements are mounted along a predetermined direction and which is moved in a direction perpendicular to the predetermined direction during exposure; storage means which stores a value corresponding to positional errors of the plurality of mounted light emitting elements in the direction perpendicular to the predetermined direction; and determination means which determines, based on the value corresponding to the positional errors stored in the storage means, a timing at which the plurality of light emitting elements are caused to emit light for each of the light emitting elements so that exposure positions obtained by the plurality of light emitting elements are arranged on the same line along the predetermined direction.

In the exposure device according to the first aspect of the present invention, a plurality of light emitting elements are mounted along a predetermined direction in a light source portion moved in a direction perpendicular to the predetermined direction during exposure, and a value corresponding to positional errors of the plurality of light emitting elements in the direction perpendicular to the predetermined direction is stored in the storage means. Meanwhile, the value corresponding to positional errors of the plurality of mounted light emitting elements can be obtained by directly measuring the mounted positions of the plurality of light emitting elements mounted in the light source portion or by actually recording an image using the exposure device of the present invention and measuring the position of the image.

Subsequently, when exposure is actually effected, based on the value corresponding to the errors stored in the storage means, the timing at which the plurality of light emitting elements are caused to emit light is determined by the determination means for each light emitting element so that exposure positions obtained by the plurality of light emitting elements are arranged on the same line along the predetermined direction. Meanwhile, when an object to be exposed has the shape of a bed, the above-described same line becomes the same straight line. Further, when an object to be exposed has the shape of a drum, the above-described same line becomes the same circumferential line.

As described above, according to the first aspect of the present invention, the timing at which the plurality of light emitting elements are caused to emit light is determined for each light emitting element so that exposure positions obtained by the plurality of light emitting elements are arranged on the same line along the predetermined direction, and therefore, deterioration in image quality caused by positional errors of the mounted light emitting elements can be prevented.

Further, a second aspect of the present invention is an exposure method comprising the steps of: storing in advance a value corresponding to positional errors of a plurality of light emitting elements, which are mounted in a light source portion along a predetermined direction, in a direction perpendicular to the predetermined direction, the light source portion being moved in the direction perpendicular to the predetermined direction during exposure; and based on the value corresponding to the positional errors and stored in advance, determining, for each of the plurality of light emitting elements, a timing at which the plurality of light emitting elements are caused to emit light so that exposure positions obtained by the plurality of light emitting elements are arranged on the same line along the predetermined direction.

In the exposure method according to the second aspect of the present invention, a plurality of light emitting elements are mounted along a predetermined direction in a light source portion moved in a direction perpendicular to the predetermined direction during exposure, and a value corresponding to positional errors of the plurality of light emitting elements in the direction perpendicular to the predetermined direction is stored in advance. Meanwhile, the value corresponding to positional errors of the plurality of light emitting elements can be obtained by directly measuring the mounted positions of the plurality of light emitting elements mounted in the light source portion or by actually recording an image using the exposure device of the present invention and measuring the position of the image.

Subsequently, when exposure is actually effected, based on the value corresponding to the errors stored in advance, the timing at which the plurality of light emitting elements are caused to emit light is determined for each of the light emitting elements so that exposure positions of the plurality of light emitting elements are arranged on the same line along the predetermined direction. Meanwhile, when an object to be exposed has the shape of a bed, the above-described same line becomes the same straight line. Further, when an object to be exposed has the shape of a drum, the above-described same line becomes the same circumferential line.

As described above, according to the second aspect of the present invention, the timing at which the plurality of light emitting elements are caused to emit light is determined for each light emitting element so that exposure positions of the plurality of light emitting elements are arranged on the same line along the predetermined direction. Accordingly, in the same way as in the exposure device of the first aspect of the present invention, deterioration in image quality caused by positional errors of the mounted light emitting elements can be prevented.

BRIEF DESCRIPTION OF THE DRAWINGS

FIG. 1 is a perspective view of an image recording apparatus according to an embodiment of the present invention.

FIG. 3 is a cross-sectional side view which shows an internal structure of the image recording apparatus according to the embodiment of the present invention.

FIG. 5 is a schematic plan view which shows a state in which LED chips are arranged in a light source portion.

FIG. 8 is a plan view of a full-color-image forming light source portion, which shows correct mounting positions of LED chips according to the embodiment of the present invention, actual mounted positions of the LED chips, and the direction in which the full-color-image forming light source portion moves at the time of main scan.

DESCRIPTION OF THE PREFERRED EMBODIMENTS

In an embodiment of the present invention, a case will be hereinafter described in which an exposure device of the present invention is applied to an image recording apparatus which controls emission of light from LED chips based on image data to record an image on a photosensitive material.
Overall Structure (Exterior View)

Figure 2:
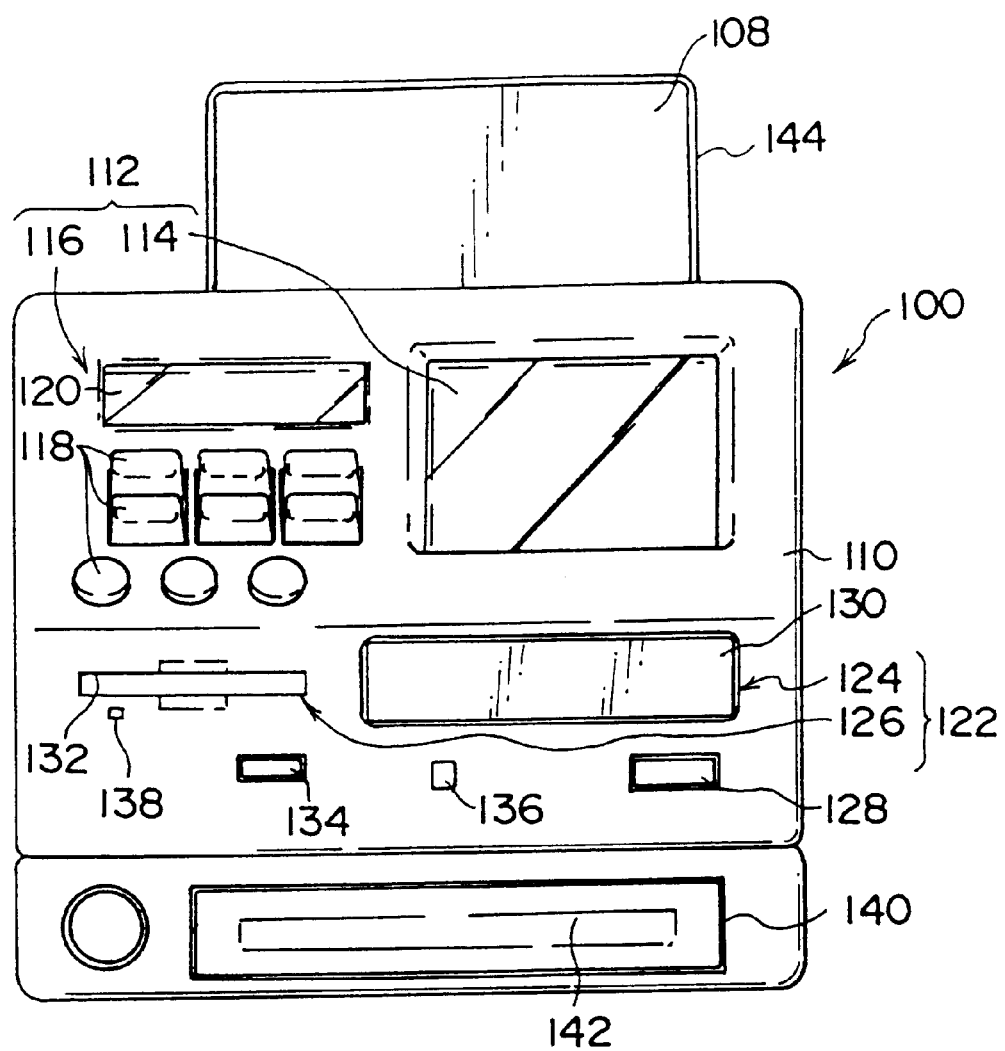
FIG. 2 is a front view of the image recording apparatus according to the embodiment of the present invention.

Referring now to FIGS. 1 through 3, there is shown an image recording apparatus 100 according to an embodiment of the present invention.

The image recording apparatus 100 reads image data recorded on a CD-ROM 102 or a floppy disk (FD) 104 (which are both shown in FIG. 3), and exposes an image based on the image data onto a photosensitive material 106, and also transfers and outputs an image recorded on the photosensitive material 106 to a plain paper (an image receiving paper 108).

An upper portion of the front surface of a box-shaped casing 110 (at the left side on the paper of FIG. 3) is formed as an inclined surface and an operation display portion 112 is provided thereon.

As shown in FIG. 2, the operation display portion 112 is divided into a monitor portion 114 and an input portion 116 which are disposed at right and left sides, respectively. The monitor portion 114 allows the read image to be displayed thereon.

Further, the input portion 116 includes a plurality of operation keys 118 and a display portion 120 for confirmation of input data and can provide for data input which is required for image recording, for example, the number of sheets to be recorded, size setting, color-balance adjustment, and negative/positive selection.

A deck portion 122 is provided below the operation display portion 112. The deck portion 122 is formed by a CD-ROM deck portion 124 and an FD deck portion 126 which are respectively disposed at right and left sides of FIG. 2.

The CD-ROM deck portion 124 is provided in such a manner that a tray 130 can be opened and closed by pressing an open/close button 128. The CD-ROM 102 can be loaded in the interior of the apparatus by placing the CD-ROM on the tray 130.

An FD insertion slot 132 is provided in the FD deck portion 126. When the FD 104 is inserted in the FD insertion slot 132, a driving system within the apparatus is actuated to insert the FD 104 into the apparatus. Further, in order to take out the FD 104 from the FD deck portion 126, an operation button 134 is pressed to eject the FD 104.

Further, access lamps 136 and 138 are respectively provided for the CD-ROM deck portion 124 and the FD deck portion 126 and are each provided to be turned on during access within the apparatus.

A discharge tray 140 is provided further below the deck portion 122. The discharge tray 140 is usually accommodated within the apparatus and is provided to be drawn out by the finger of an operator being placed on a holding portion 142 (see FIG. 1).

The image receiving paper 108 on which the image is recorded is discharged onto the discharge tray 140.

The image receiving paper 108 is accommodated in advance on a tray 144 in layers. The tray 144 is loaded in a tray loading aperture 146 formed on an upper surface of the casing 110. The image receiving papers 108 are taken out one by one from the tray 144 loaded in the tray loading aperture 146, and after images are transferred onto the image receiving papers 108, these image receiving papers 108 are each guided to the discharge tray 140.

Two circular cover members 148 and 150 are attached to the right side surface of the casing 110 (i.e., to the side surface of the casing 110 which can be seen in FIG. 1). These cover members 148 and 150 are each provided so as to be independently removable. As shown in FIG. 3, a take-up reel 154 and a feed reel 152 onto which the rolled photosensitive material 106 is wound are disposed within the apparatus along the axial directions of the cover members 148 and 150, respectively. These reels 152 and 154 can be taken out from or loaded into the apparatus in a state in which the covers 148 and 150 are removed.

Image Receiving Paper Conveying System

As shown in FIG. 3, the tray 144 loaded in the tray loading aperture 146 is provided in such a way that an upper surface of the leading end of the tray (the side where the tray 144 is loaded in the tray loading aperture 146) faces a semicircular roller 156.

The semicircular roller 156 is formed by cutting a cylindrical roller along a plane parallel to an axis thereof. Usually, the cut surface 158 of the semicircular roller 156 faces the surface of an uppermost image receiving paper 108 within the tray 144 with a space formed therebetween. When the semicircular roller 156 rotates, the image receiving paper 108 of the uppermost layer and the peripheral surface of the semicircular roller 156 come into contact with each other, and the image receiving paper 108 is pulled out by a small amount when the semicircular roller 156 makes one rotation. The pulled-out image receiving paper 108 is nipped between a first roller pair 160 and is completely pulled out from the tray 144 by the driving force of the first roller pair 160.

A second roller pair 162, a guide plate 164, and a third roller pair 166 are sequentially disposed on the downstream side of the first roller pair 160. After having been nipped by the first roller pair 160, the image receiving paper 108 is nipped by the second roller pair 162, guided by the guide plate 164, and further nipped by the third roller pair 166.

The image receiving paper 108 overlaps with the photosensitive material 106 at the third roller pair 166. Namely, the third roller pair 166 is also used as a conveying path for the photosensitive material 106.

Photosensitive Material Conveying System

The photosensitive material 106 is loaded into the apparatus in an elongated state and wound onto the feed reel 152 in a layered form. The feed reel 152 is loaded in a predetermined position in such a manner that the cover member 150 (at the side of the apparatus) is removed and the feed reel 152 is inserted into the apparatus in the axial direction thereof.

With the photosensitive material 106 being loaded in the predetermined position, the leading end of the photosensitive material is pulled out and loading of the photosensitive material 106 is effected along a predetermined conveying path at the initial stage. The loading sequence consists of the outermost layer of the photosensitive material 106 being pulled out from the feed reel 152, nipped by a fourth roller pair 168 in the vicinity of the feed reel 152, conveyed through a reservoir portion 170 and a guide plate 172, and nipped by the third roller pair 166, and thereafter, being entrained onto a heat roller 174 and a take-up reel 154 sequentially. In this case, a leading portion having a length required for loading may be provided at the leading end portion of the photosensitive material 106 wound onto the feed reel 152.

On the conveying path of the photosensitive material 106, an exposure section 176 is provided between the fourth roller pair 168 and the reservoir portion 170. Further, a water applying portion 178 is provided between the reservoir portion 170 and the guide plate 172. The exposure section 176 and the water applying portion 178 will be described later in detail. After the photosensitive material 106 has been exposed with an image in the exposure section 176, the photosensitive material 106 is laminated with the image receiving material 108 at the third roller pair 166 in a state in which the emulsion surface (i.e., the surface to be exposed) is wet from the application of water.

Heat Roller

The heat roller 174 serves as a heat development-transfer section of the apparatus and is formed by a cylindrical roller main body 180 and a heater 182 provided within the roller main body 180 along the axial direction of the roller main body. The heat roller 174 serves to apply heat to members wound onto the roller main body 180 (i.e., the photosensitive material 106 and the image receiving material 108) by heating the surface of the roller main body 180 through the operation of the heater 182. The heating of the heat roller 174 enables heat development-transfer processing and the image recorded on the photosensitive material 106 is thereby transferred onto the image receiving paper 108.

A peeling roller 184 and a peeling claw 186 are disposed at a lower right side and in the vicinity of the heat roller 174 and are provided to separate the image receiving paper 108, which has been wound onto the heat roller 174 by a length of about one third the overall circumference of the heat roller 174, from the photosensitive material 106, and to guide the image receiving paper 108 toward the discharge tray 140.

On the other hand, the photosensitive material 106 is wound onto the heat roller 174 by a length of about half the overall circumference of the heat roller and is turned around in an opposite direction to be guided to a position where the take-up reel 154 is mounted.

Water Applying Portion

As shown in FIG. 3, the water applying portion 178 imparts water, which serves as an image forming solvent, onto the photosensitive material 106 or the image receiving paper 108 to allow the laminating surfaces of the photosensitive material 106 and the image receiving paper 108 to closely adhere to each other, thereby achieving heat-development. The water applying portion 178 is formed by an elongated applying member 188 extending along a transverse direction of the photosensitive material 106 and a tank 190 which is filled with water.

The applying member 188 is formed of a high water-absorptive material, for example, felt, sponge, or the like, having a suitable degree of hardness and is disposed so as to contact the photosensitive material 106 at a predetermined pressure during conveying of the photosensitive material 106. The water in the tank 190 is constantly supplied to the applying member 188 in a suitable quantity through capillary action. When the photosensitive material 106 and the applying member 188 contact each other, water is applied to the surface (i.e., the emulsion surface) of the photosensitive material 106 by the applying member 188.

Further, since the applying member 188 abuts against the photosensitive material 106 at an appropriate pressure, water is uniformly applied to the photosensitive material 106.

Replenishment of the water in the tank 190 is effected by removing the entire water applying portion 178 from the apparatus, but water may be constantly supplied from an exterior of the apparatus by using a pipe arrangement.

Moreover, in the present embodiment, water is used as the image forming solvent, but the water used in this embodiment is not limited to pure water and also includes water which is widely and generally used. Further, a mixed solvent of water and a low-boiling-point solvent such as methanol, DMF, acetone, diisobutylketone, or the like may be used. Moreover, a solution which contains an image formation accelerator, an anti-fogging agent, a development stopping agent, a hydrophilic heat solvent, or the like may also be used.

Exposure Section

Figure 4:
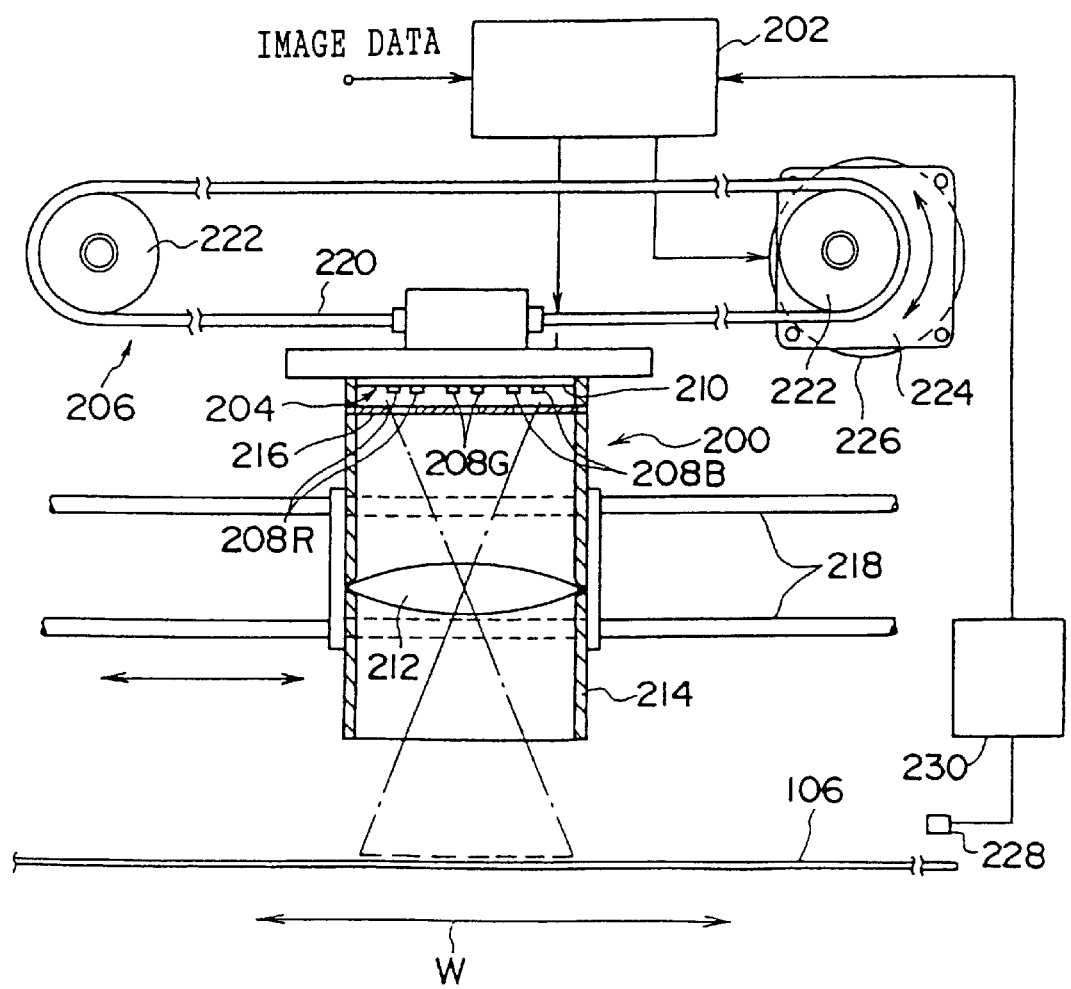
FIG. 4 is a schematic front view which shows a structure of an exposure section.

FIG. 4 shows an exposure section 176 according to the present embodiment.

The exposure section 176 is mainly formed from a light source unit 200 which is provided above the conveying path of the photosensitive material 106 and which is connected to a controller 202. Image data (image data read from the CD-ROM 102 or FD 104) is stored in the controller 202 and a full-color-image forming light source portion 204 within the light source unit 200 is turned on in accordance with the image data. Meanwhile, the structures of a portion of the controller 202 which causes the full-color-image forming light source portion 204 to be turned on and its peripheries, which are particularly related to the present invention, namely, the structure corresponding to the exposure section of the present invention will be hereinafter described in detail.

The light source unit 200 is provided so as to be movable in the transverse direction of the photosensitive material 106 (i.e., the main scanning direction) when driven by a main scan unit 206, which will be described later. The main scan is effected when the photosensitive material 106 stops during step driving in the exposure section 176.

The light source unit 200 of the exposure section 176 is covered by a box-shaped exposure casing 214. The full-color-image forming light source portion 204 is disposed on the upper end surface of the exposure casing 214 and a light emission surface of the full-color-image forming light source portion 204 is directed toward the interior of the exposure casing 214. An aperture 216 is provided on the side of the light emission surface of the full-color-image forming light source portion 204 to limit spread of light from a plurality of LED chips 208, i.e., R-LED chips 208R, G-LED chips 208G, and B-LED chips 208B which emit light of colors of red (R), green (G), and blue (B) (eleven LED chips for each color) (see FIG. 5).

A lens 212 is provided on the downstream side of the aperture 216 and at the central portion of the exposure casing 214 and serves to converge light from the full-color-image forming light source portion 204 to form an image on the photosensitive material 106. The resolution of light for image formation is about 300 to 400 dpi. The lens 212 is shown as a single body, but a single lens system formed by a combination of a plurality of lenses may also be provided.

In this case, the lens 212 is formed by a plurality of lenses and an aperture and is characterized by the magnification thereof not varying even when the height of an image surface changes somewhat. The lens 212 can eliminate a minute error occurring during the main scanning movement of the main scan unit 206.

Further, the focus of the lens 212 is constantly adjusted by an automatic focusing mechanism (not shown).

The light source unit 200 is supported by a pair of guide shafts 218 disposed parallel to each other and forming a part of the main scan unit 206. These guide shafts 218 are provided along the transverse direction of the photosensitive material 106 (i.e., the direction indicated by arrow W in FIG. 4). The light source portion 204 is guided by the guide shafts 218 so as to be movable in the transverse direction of the photosensitive material 106.

A portion of an endless timing belt 220 is fixed at the exposure casing 214 of the full-color-image forming light source portion 204. The timing belt 220 is entrained onto sprockets 222 positioned in the vicinities of both ends of the pair of guide shafts 218. The rotating shaft of one of the sprockets 222 is connected via a transmission 224 to the rotating shaft of a stepping motor 226. Due to the reciprocating rotation of the stepping motor 226, the full-color-image forming light source portion 204 is moved along the guide shafts 218 in a reciprocating manner.

The driving of the stepping motor 226 is controlled by the controller 202 and is synchronized with the step driving of the photosensitive material 106. Namely, in the state in which the photosensitive material 106 has moved by one step and is stopped, the stepping motor 226 starts rotating to move the full-color-image forming light source portion 204 on the photosensitive material 106 along the transverse direction of the photosensitive material 106. When the stepping motor 226 is rotated in the reverse direction after a predetermined number of pulses has been confirmed, the full-color-image forming light source portion 204 returns to its original position. Subsequent movement of the photosensitive material 106 starts simultaneously with the returning motion of the full-color-image forming light source portion 204.

A photodiode 228 is provided at the light emitting side in the light source unit 200 so as to face the photosensitive material 106 in the vicinity of a main-scan starting position and outputs an analog signal having a magnitude which corresponds to the quantity of light from the full-color-image forming light source portion 204. The photodiode 228 is connected to a light-quantity correction unit 230 and the analog signal is inputted to the light-quantity correction unit 230.

The light-quantity correction unit 230 compares the respective quantities of light from the LED chips 208 of each of the detected colors to adjust the quantity of light and color balance, and further outputs a correction value to the controller 202. The image data to be transmitted to the full-color-image forming light source portion 204 is corrected based on the correction value and each LED chip 208 is turned on with the proper quantity of light.

As shown in FIG. 5, the full-color-image forming light source portion 204 is formed with the B-LED chips 208B, the G-LED chips 208G, and the R-LED chips 208R being arranged in groups. These LED chips 208 are mounted onto a substrate 210 along the transverse direction of the photosensitive material 106 (i.e., the main scanning direction), each following the same stipulated layout. Namely, on the substrate 210 in the plan view shown in FIG. 5, eleven B-LED chips 208B are arranged in two rows in a zigzag manner at the right edge, eleven R-LED chips 208R are arranged in two rows in a zigzag manner at the left edge, and eleven G-LED chips 208G are arranged in two rows in a zigzag manner in the center. Accordingly, the LED chips 208 are arranged in a total of six rows.

A predetermined wiring arrangement is provided on the substrate 210 by etching processing or the like and each wire is covered by metal for thermal radiation so as not to cause a short circuit between the wires. For this reason, generation of heat due to the LED chips 208 being turned on can be restricted, and variations in the amount of light emitted can also be limited. The dimensions of each LED chip 208 (x×y) are about 360×360 $\mu$m.

As shown in FIG. 5, the row pitch P (i.e., a pitch in the main scanning direction) of the same color LED chips 208 to be mounted on the substrate 210 is 600 $\mu$m, the line pitch L (i.e., a pitch in the sub-scan direction) of each row of the LED chips is 520 $\mu$m, and the distance D of a stepped portion formed in the zigzag arrangement along the vertical direction of the substrate is 260 $\mu$m. The respective distances G between the R-LED chips 208R and the G-LED chips 208G, and between the G-LED chips 208G and the B-LED chips 208B, are preferably equal to each other. The diagonal line section of each of the LED chips 208 shown in FIG. 5 is a region from which light is actually emitted. As shown in the dotted lines shown in FIG. 5, the borders of the light emission regions in the adjacent zigzag rows of LED chips are disposed so as to line up with each other.

In the full-color-image forming light source portion 204 having the above-described structure, eleven main scanning lines can be recorded on the photosensitive material 106 in one main scan operation for each of the colors. The main scanning line pitch numbers are ten (an even number).

Figure 6:
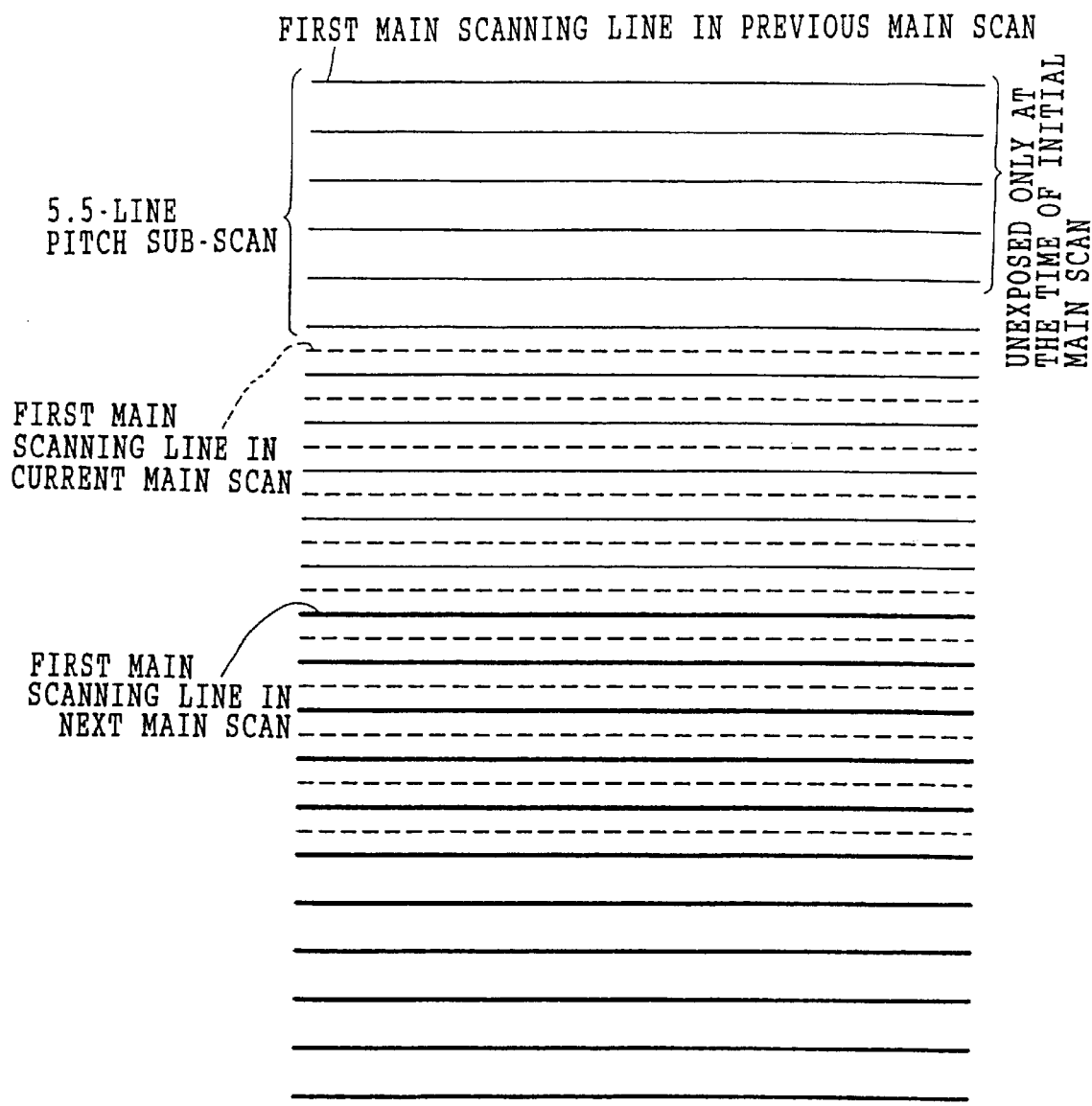
FIG. 6 is a plan view of a photosensitive material, which shows a state of main scanning lines and sub-scan pitches.

In the present embodiment, as shown in FIG. 6, the stepwise movement of the photosensitive material 106 is controlled so that sub-scan driving and stopping are repeated at a pitch (5.5-line pitch) in which the first main scanning line recorded on the photosensitive material 106 comes to an intermediate position between the sixth and seventh main scanning lines in the previous main scan operation. In FIG. 6, eleven solid thin lines indicate main scanning lines formed by the previous main scan operation, eleven broken lines indicate main scanning lines formed by the current main scan operation, and eleven solid thick lines indicate main scanning lines formed by the next main scan operation.

As described above, the number of the LED chips 208 are set at an odd number so that the main scanning line pitch numbers are set at an even number (i.e., ten), and a main scanning line is additionally formed between the main scanning lines so as to double the resolution. As described above, since the number of LED chips 208 for each color of emitted light is set at an odd number so that the number of intervals of the LED chips 208 is set at an even number and the main scanning line is additionally formed between the main scanning lines, the sub-scan pitch can be made uniform. Further, main scanning lines are not written between two adjacent scanning lines from the first to fifth main scanning lines during the first main scan driving owing to system control.

Figure 7:
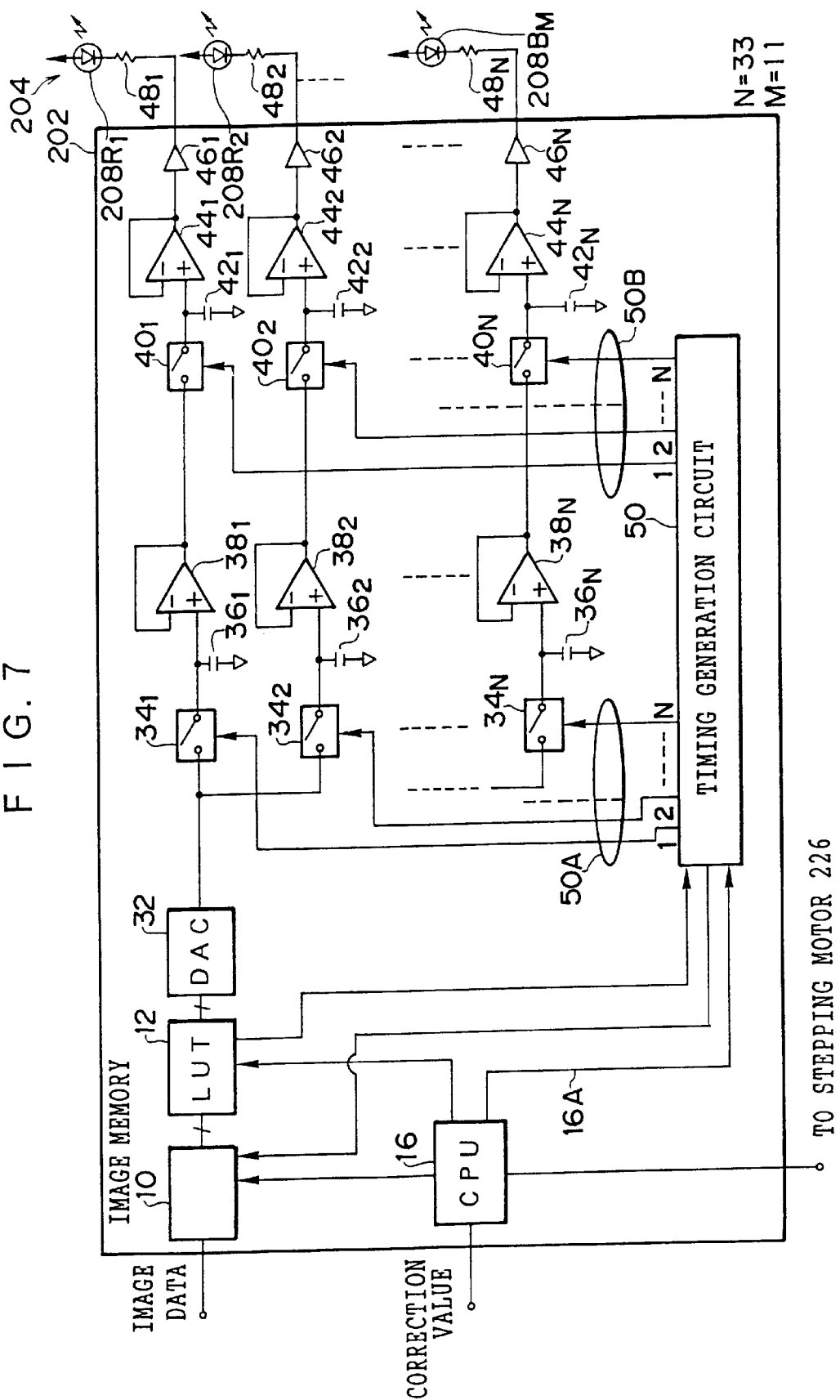
FIG. 7 is a circuit diagram which shows a circuit structure of a portion, which causes the light source portion to be turned on, within a controller according to the embodiment of the present invention.

Next, the structures of a portion of the controller 202 which causes the full-color-image forming light source portion 204 to be turned on, and its peripheries, which are particularly related to the present invention, namely, the structure of a portion corresponding to the exposure section of the present invention will be described in detail with reference to FIG. 7.

The controller 202 includes the image memory 10 in which input image data is temporarily stored. The output end of the image memory 10 is connected to the input end of a look-up table (LUT) 12 serving as storage means which is formed by a memory in which a conversion table which converts the input image data in accordance with a predetermined rule and data which indicate positional errors of the mounted LED chips 208 in the full-color-image forming light source portion 204 are stored in advance for each channel. The output end of LUT 12 is connected to the input end of a digital/analog (DA) converter 32 which converts digital signals of one channel to analog signals.

Meanwhile, the measurement procedure for data which indicate positional errors of the mounted LED chips 208, the data being stored in LUT 12, will be described later.

The output end of the DA converter 32 branches into a plurality of lines (in the present embodiment, the number of the LED chips 208, i.e., 33) and is connected to one end of a switch portion of each analog switch $34_n$ ("n" indicates 1 to N, and in the present embodiment, N=33, which applies correspondingly to the following). The other end of the switch portion of each analog switch $34_n$ is connected to one end of a capacitor $36_n$ and is also connected to a non-reverse input end of a buffer amplifier $38_n$. Further, the other end of the capacitor $36_n$ is grounded.

The output end of the buffer amplifier $38_n$ is connected to a reverse input end of the buffer amplifier $38_n$ and is also connected to one end of a switch portion of an analog switch $40_n$. The other end of the switch portion of the analog switch $40_n$ is connected to one end of a capacitor $42_n$ and is also connected to a non-reverse input end of a buffer amplifier $44_n$. Further, the other end of the capacitor $42_n$ is grounded.

The output end of the buffer amplifier $44_n$ is connected to a reverse input end of the buffer amplifier $44_n$ and is also connected via a driver $46_n$ and a resistance $48_n$ to each cathode of R-LED chips $208R_m$, G-LED chips $208G_m$, and B-LED chips $208B_m$ in the full-color-image forming light source portion 204 ("m" is 1 to M, and in the present embodiment, M=11). These LED chips are mounted in such a manner that eleven LED chips are provided for each of colors R, G, and B. A predetermined voltage is applied to each anode of the LED chips $208R_m$, $208G_m$, and $208B_m$.

Further, a switching input end of each analog switch $34_n$ is connected to an output end of a sampling signal 50A corresponding to each channel of a timing generation circuit 50 which serves as determination means. A switching input end of each analog switch $40_n$ is connected to an output end of a sampling signal 50B corresponding to each channel of the timing generation circuit 50. Accordingly, the switch portions of the analog switch $34_n$ and the analog switch $40_n$ can be each independently subjected to on-off control by the timing generation circuit 50.

As described above, a first-stage sample-and-hold circuit is formed by the analog switch $34_n$, the capacitor $36_n$, and the buffer amplifier $38_n$ and a second-stage sample-and-hold circuit is formed by the analog switch $40_n$, the capacitor $42_n$, and the buffer amplifier $44_n$.

The light-quantity correction unit 230 and the image memory 10 are each connected to the controller 202 and the controller 202 includes CPU 16 which effects correction of image data stored in the image memory 10 based on the correction value inputted from the light-quantity correction unit 230.

The CPU 16 is also connected to the stepping motor 226, the timing generation circuit 50, and the LUT 12. The CPU thus controls the stepwise movement of the full-color-image forming light source portion 204, and outputs, to the timing generation circuit 50, a pixel clock signal (also seen in FIG. 9) which indicates one cycle when recording of an image of one pixel is effected in the main scanning direction, and further renews a conversion table of each channel of LUT 12 and data which indicate positional errors of the mounted LED chips 208.

The timing generation circuit 50 is also connected to the image memory 10 and the LUT 12, and thus inputs image data stored in the image memory 10 based on the pixel clock signal 16A inputted from the CPU 16 to the DA converter 32 via the LUT 12, and reads data which indicate positional errors of the mounted LED chips, and further generates, based on the read data, a sampling signal 50B to be inputted to a switching input end of each analog switch $40_n$.

Meanwhile, 33 LED chips 208 mounted on the substrate 210 of the full-color-image forming light source portion 204 are arranged in six rows along the main scanning direction as shown in FIG. 5 and there are differences in the mounted position of LED chips of each row in the main scanning direction. For this reason, the CPU 16 prepares in advance image data corresponding to each LED chip for the image data stored in the image memory 10 so that exposure positions, on the photosensitive material 106, by light emitted from all LED chips 208 are arranged on the same straight line along the sub-scan direction based on the above-described differences of the mounted positions. As a result, the timing generation circuit 50 does not need to consider the differences of the mounted positions of the LED chips in the main scanning direction, and it suffices that, with only positional errors of the mounted LED chips taken into consideration, each of the LED chips 208 may be turned on.

Further, the above-described analog switches $34_n$ and $40_n$ each may be an FET switch, a reed relay, and the like.

Reservoir Portion The reservoir portion 170 (see FIG. 3) is, as described above, disposed between the exposure section 176 and the water applying portion 178 and is formed by two pairs of nip rollers 192 and 194 and one dancer roller 196. The photosensitive material 106 is entrained between the two pairs of nip rollers 192 and 194 and a substantially U-shaped slack portion is formed in the photosensitive material 106 between these pairs of nip rollers. The dancer roller 196 moves up and down correspondingly to the amount of slack so as to maintain the amount of slack in the photosensitive material 106.

In the exposure section 176, the photosensitive material 106 is moved in a stepwise manner, but in the water applying portion 178, it is necessary that the photosensitive material 106 be conveyed at a fixed speed so as to allow uniform application of water onto the photosensitive material 106. For this reason, a difference in the conveying speed of the photosensitive material 106 is generated between the exposure section 176 and the water applying portion 178. In order to absorb the difference in the conveying speed, the dancer roller 196 moves up and down to adjust the amount of slack formed in the photosensitive material 106, so that the stepwise movement and the constant-speed movement of the photosensitive material 106 can be carried out simultaneously.

Next, operation of the present embodiment will be described. The overall flow of an image recording operation will be first described.

In a state in which the tray 144 has been loaded into the tray loading aperture 146, and the feed reel 152 onto which the photosensitive material 106 has been completely taken up, and the take-up reel 154 which is in an empty state, have been mounted in their respective predetermined positions, and also when loading has been completed, then when the printing start key of the operation display portion 112 is operated, the controller 202 reads image data from the CD-ROM 102 or the FD 104 and stores the read image data in the image memory 10.

When the image data is stored in the controller 202, the feed reel 152 is driven to start conveying the photosensitive material 106.

When the photosensitive material 106 arrives at a predetermined position in the exposure section 176, the photosensitive material 106 is stopped temporarily and image data is outputted from the controller 202 to the full-color-image forming light source portion 204. The image data is outputted every eleven lines and the full-color-image forming light source portion 204 is guided along the guide shaft 218 by the driving of the stepping motor 226 to move along the transverse direction of the photosensitive material 106 (main scan).

Prior to the outputting of the image data, the amount of light for each of the colors from the full-color-image forming light source portion 204 is detected by the photodiode 228, and in the light-amount correction unit 230, a correction value for adjustment of the density, color balance, and the like is supplied to the CPU 16 of the controller 202, to thereby correct the image data. This correction of the image data is made for each image.

As shown in FIG. 6, when the first main scan is completed, the photosensitive material 106 is moved by one step (5.5-line pitch) and stops, and subsequently, the second main scan is effected. By repeating the above main scans, an image of one frame is recorded on the photosensitive material 106. Namely, the main scanning lines are each formed at a pitch half the pitch of the LED chips 208 arranged and the resolution of the image is thereby improved. In this case, it suffices that five main scanning lines from the uppermost side on one image surface at the first main scan driving operation and five main scanning lines from the lowermost side at the final main scan driving operation be each brought into an unexposed state (the LED chips 208 are turned off).

The photosensitive material 106 on which the image has been recorded is held by the drive of the upstream side nip roller pair 192 only in the reservoir portion 170 (the downstream side nip roller pair 194 is stopped), in a state of having a slack portion in the reservoir portion 170 able to be entrained onto the dancer roller 196. For this reason, the above photosensitive material 106 is disposed so as not to reach the water applying portion 178.

When the photosensitive material 106 having a length of one image is accumulated in the reservoir portion 170, the nip roller pair 194 on the downstream side of the reservoir portion 170 starts driving. As a result, the photosensitive material 106 (with images having been recorded thereon) is conveyed to the water applying portion 178. In the water applying portion 178, the photosensitive material 106 is conveyed at a constant speed and water is uniformly applied to the photosensitive material by the applying member 188.

Water is constantly conveyed from the tank 190 to the applying member 188 and the photosensitive material 106 is pressed by the applying member 188 at a predetermined pressure. For this reason, the proper amount of water is applied to the photosensitive material 106.

The photosensitive material 106 to which water is applied is guided by the guide plate 172 and is conveyed to the third roller pair 166.

On the other hand, the peripheral surface of the semicircular roller 156 and the leading end of the image receiving paper 108 are made to contact each other by one rotation of the semicircular roller 156, and the uppermost sheet of the image receiving paper stack 108 is pulled out and nipped by the first roller pair 160. The image receiving paper 108 is pulled out from the tray 144 by being driven by the first roller pair 160 and waits for the arrival of the photosensitive material 106 in a state of being nipped by the second roller pair 162.

Synchronously with the passing of the photosensitive material 106 through the guide plate 172, the first roller pair 160 and the second roller pair 162 start driving and the image receiving paper 108 is guided by the guide plate 164 and conveyed to the third roller pair 166.

The photosensitive material 106 and the image receiving paper 108 are nipped by the third roller pair 166 in a laminated state and are conveyed to the heat roller 174. At this time, the photosensitive material 106 and the image receiving paper 108 closely contact each other due to the water applied to the photosensitive material 106.

The photosensitive material 106 and the image receiving paper 108 in a laminated state are entrained onto the heat roller 174 and are subjected to heat from the heater 182 for heat development-transfer processing. In other words, the image recorded on the photosensitive material 106 is transferred onto the image receiving paper 108 so as to form an image on the image receiving paper 108.

The heat development-transfer processing is completed with the image receiving paper 108 in a state of being wound onto the heat roller 174 by a length of about one third the total circumference of the roller, and subsequently, the image receiving paper 108 is separated from the photosensitive material 106 by the peeling roller 184 and the peeling claw 186, and is entrained by the peeling roller 184 to be discharged onto the discharge tray 140.

On the other hand, the photosensitive material 106 is wound onto the heat roller 174 by a length of about a half the overall circumference of the roller, and thereafter, the photosensitive material 106 moves in the tangential direction and is wound onto the take-up reel 154.

Next, a description will be given of the measurement procedure for data which indicates positional errors of the mounted LED chips 208 in the full-color-image forming light source portion 204, the data being stored in advance in the LUT 12.

First, all analog switches $34_n$ (see FIG. 7) are each brought into an on-state and a digital value which finally allows each LED chip 208 to fully emit light is inputted to the DA converter 32. Subsequently, in this state, movement of the full-color-image forming light source portion 204 in the main scanning direction starts, and thereafter, the analog switches $40_n$ are simultaneously brought into an on state. With a predetermined time having elapsed, the analog switches $40_n$ are brought into an off state and only one main scan is effected for the photosensitive material 106. Subsequently, an image formed on the photosensitive material 106 is outputted in such a manner as to be transferred by heat-development onto the image receiving paper 108.

When the R-LED chips $208R_m$ are mounted at correct positions, images recorded on the image receiving paper 108 by the above-described procedure due to exposure of the R-LED chips $208R_m$ each become a straight-line image extending in the main scanning direction with respective record start positions of the images being arranged on the same straight line along the sub-scan direction. However, when any R-LED chip $208R_m$ is not mounted at a correct position, the record start position of an straight-line image is displaced from the same straight line by a distance corresponding to a positional error of the mounted LED chip. Accordingly, by measuring an amount of the displacement, the positional error of the mounted R-LED chip $208R_m$ can be measured.

In the cases of the G-LED chips $208G_m$ and the B-LED chips $208B_m$ as well, the positional error of each mounted LED chip can be measured by actually recording a straight-line image on the image receiving paper 108.

In this case, when the record start position of each straight-line image is difficult to be measured due to a short distance between adjacent straight-line images for each color of LED chips, the images being recorded on the image receiving paper 108, only one LED chip is caused to emit light at one main scan operation, and each time one main scan operation is completed, the photosensitive material 106 is moved by a small amount in the sub-scan direction for each LED chip. As a result, the distance between adjacent straight images to be recorded by the LED chips is made larger to facilitate measurement of the record start position.

Figure 9:
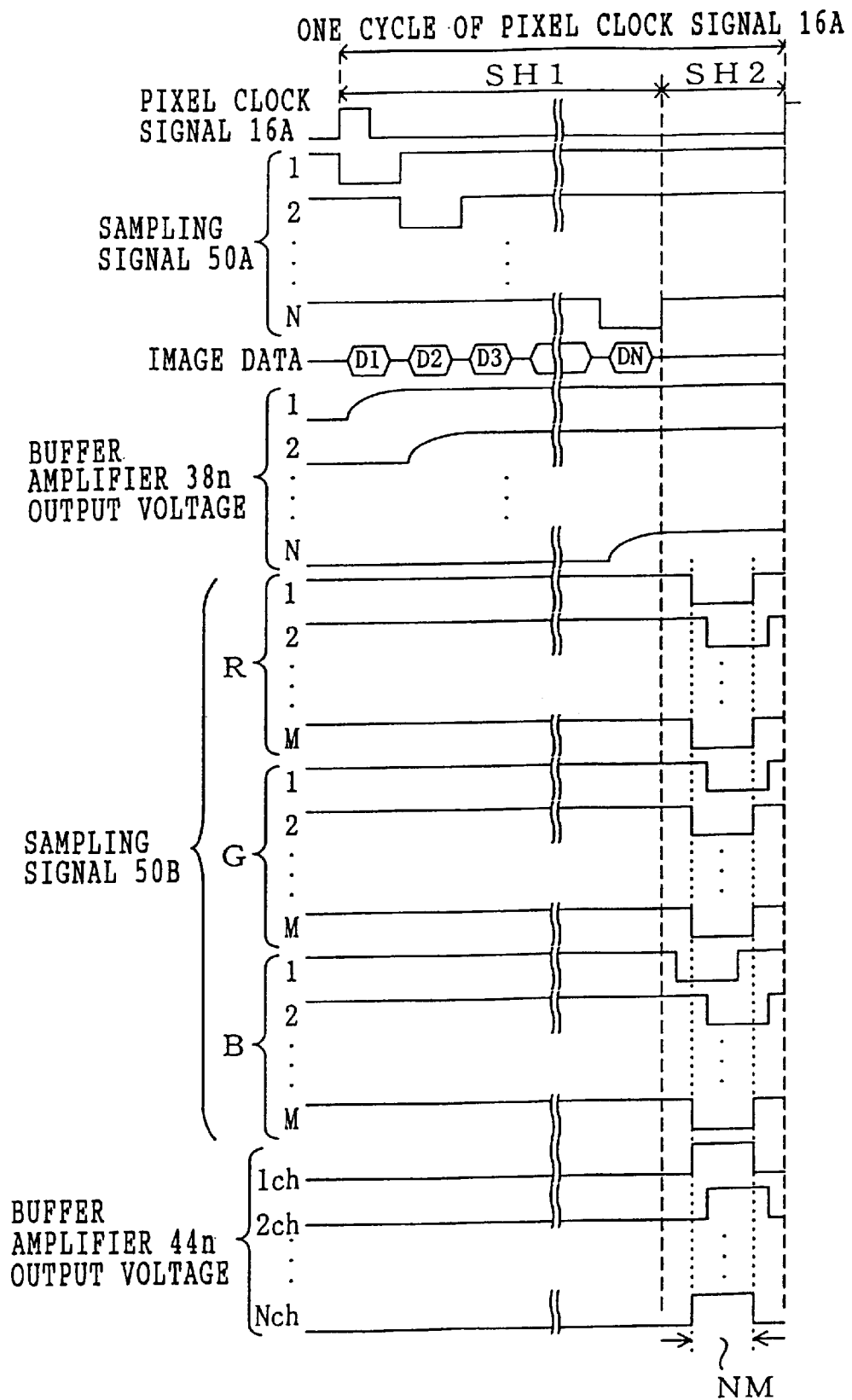
FIG. 9 is a time chart used for illustrating the operation of the controller.

Next, the operation of a portion of the full-color-image forming light source portion 204, which causes the LED chips 208 to emit light will be described in detail with reference to FIGS. 7 to 9.

FIG. 8 is a plan view of the full-color-image forming light source portion 204, which shows exact mounted positions of the LED chips 208 in the full-color-image forming light source portion 204 and the direction, MS, in which the full-color-image forming light source portion 204 moves at the main scan. In the present embodiment, as illustrated in FIG. 8, the R-LED chip $208R_2$ in the full-color-image forming light source portion 204 is displaced by a distance, RS1, from the correct mounted position of the R-LED chip 208R (i.e., the position where the center of the R-LED chip 208R in the main scanning direction coincides with a mounting reference line RL) in the direction opposite to the direction of movement MS. The G-LED chip $208G_1$ is displaced by a distance, GS1, from the correct mounted position of the G-LED chip 208G (i.e., the position where the center of the G-LED chip 208G in the main scanning direction coincides with a mounting reference line GL) in the direction opposite to the direction of movement MS. Further, the B-LED chip $208B_1$ is displaced by a distance, BS1, from the correct mounted position of the B-LED chip 208B (i.e., the position where the center of the B-LED chip 208B in the main scanning direction coincides with a mounting reference line BL) in the same direction as that of movement MS, and the B-LED chip $208B_2$ is displaced by a distance, BS2, from the correct mounted position of the B-LED chip 208B in the direction opposite to that of movement MS.

First, when the pixel clock signal 16A inputted from the CPU 16 to the timing generation circuit 50 becomes a high level (see FIG. 9), in each of N sections (N is the number of channels) into which a period SH1 is divided, in which one cycle of the pixel clock signal 16A is divided by time sharing into two parts, SH1 and SH2, the timing generation circuit 50 generates a sampling signal 50A by which the analog switch $34_n$ corresponding to each channel is turned on in numerical order of channels and starts application of the sampling signal 50A to each analog switch $34_n$. Simultaneously, the timing generation circuit 50 starts applying, to the analog switch $40_n$, a sampling signal 50B generated to switch off the analog switch $40_n$ during the period SH1. The analog switches $34_n$ and $40_n$ used in the present embodiment are each turned on when a signal applied to each switching input end is set at a low level.

When application of the sampling signal 50A to the switching input end of each analog switch $34_n$ and application of the sampling signal 50B to the switching input end of each analog switch $40_n$ start, the timing generation circuit 50 starts input of image data of N channels from the image memory 10 via the LUT 12 to the DA converter 32, i.e., input of image data for causing emission of light from N LED chips 208 provided in the full-color-image forming light source portion 204.

In this case, input of image data for each channel is effected within a period in which the sampling signal 50A corresponding to each channel is set at a low level (see FIG. 9), i.e., a period in which the analog switch $34_n$ is switched on, and is also effected over a period in which sample and hold of image data of each channel can be effected in a capacitor $36_n$ corresponding to each channel. Image data of N channels inputted to the DA converter 32 are each converted by a conversion table stored for each channel within the LUT 12.

Application of the sampling signal 50A to the switching input end of each analog switch $34_n$ and input of image data to the DA converter 32 allow sampling of a voltage corresponding to the image data of each channel in the capacitor $36_n$ connected to each analog switch $34_n$. An output voltage of each buffer amplifier $38_n$ connected to each capacitor $36_n$, i.e., an output voltage of the first-stage sample-and-hold circuit starts to rise substantially at the same time as the input of image data of each channel to the DA converter 32 (see FIG. 9). At the point in time application of a low level of the sampling signal 50A corresponding to each of N channels has been completed, the output voltages corresponding to the image data of all channels are each brought into a hold state.

Subsequently, in the period SH2, the timing generation circuit 50 allows the sampling signal 50B to be brought into a state in which the analog switch $40_n$ is switched on, i.e., to be set in a low-level state.

In this case, the timing generation circuit 50 refers to data which indicate positional errors of the mounted LED chips, the data being stored in advance in the LUT 12, and varies, for the LED chip mounted at the correct mounted position, the sampling signal 50B to be applied to the switching input end of an analog switch $40_n$ corresponding to the LED chip so that the analog switch $40_n$ is switched on in a predetermined period NM of the period SH2. The predetermined period NM is set in advance as a period in which the LED chip 208 can be caused to emit light only for a required time.

For the LED chips displaced in the direction opposite to the direction, MS, in which the full-color-image forming light source portion 204 moves (also seen in FIG. 8), the sampling signal 50B to be applied to the analog switch $40_n$ corresponding to each of the above LED chips is varied so that a start time with the analog switch $40_n$ switched on is delayed by a time corresponding to the distance of displacement. Further, for the LED chips displaced in the same direction as the direction, MS, in which the full-color-image forming light source portion 204 moves, the sampling signal 50B to be applied to the analog switch $40_n$ corresponding to each of the LED chips is varied so that a start time with the analog switch $40_n$ switched on is advanced by a time corresponding to the distance of displacement. Meanwhile, the time in which the analog switch $40_n$ corresponding to the displaced LED chip is switched on is set to be the same time as the predetermined period NM, i.e., the time in which the LED chip 208 can be turned on only for a required time.

In the present embodiment, the R-LED chip $208R_2$, the G-LED chip $208G_1$, and the B-LED chip $208B_2$ are respectively displaced in the direction opposite to the direction of movement MS by distances, RS1, GS1, and BS2. Accordingly, the start time of a low level, in the period SH2, of the sampling signal 50B to be applied to the analog switch $40_n$ corresponding to each of the displaced LED chips is delayed by a time which corresponds to a distance of displacement of each LED chip (see FIG. 9).

Further, the B-LED chip $208B_1$ is displaced by the distance, BS1, in the same direction as the direction of movement MS. Accordingly, the start time of a low level, in the period SH2, of the sampling signal 50B to be applied to the analog switch $40_n$ corresponding to the B-LED chip $208B_1$ is advanced by a time which corresponds to a distance of displacement of the B-LED chip $208B_1$ (see FIG. 9).

As a result, output at the output end of the buffer amplifier $44_n$, i.e., at the output end of each of second-stage sample-and-hold circuits is effected in the period in which the analog switch $40_n$ is turned on (see FIG. 9), and therefore, the output voltage is applied via the driver $46_n$ and the resistance $48_n$ to each LED chip 208 and each LED chip 208 is turned on due to a drive current corresponding to each image data supplied thereon.

As described above, the timing at which the analog switch $40_n$ is switched on is displaced so as to correspond to a positional error of each mounted LED chip, and therefore, an image obtained by exposure of each LED chip can be recorded at the same position as that when each LED chip is mounted at a correct position.

The above-described operation allows exposure of 11 lines of the first pixel in the main scanning direction onto the photosensitive material 106 by each LED chip 208.

Subsequently, in such a manner as described above, exposure is effected which corresponds to image data of the second and subsequent pixels in the main scanning direction.

As described above in detail, the exposure section 176 serving as the exposure device of the present embodiment and the controller 202 each determine the timing of input of a drive current of each LED chip correspondingly to a positional error of each mounted LED chip, and therefore, images recorded on the image receiving paper 108 can be arranged for each color of LED chips on the same straight line along the sub-scan direction and deterioration in the quality of an image, which is caused by positional errors of the mounted LED chips, can be prevented.

In the present embodiment, there was described a case in which data indicating positional errors of the mounted LED chips 208 and stored in advance in the LUT 12 is obtained by recording in advance a straight-line image on the image receiving paper 108 for each LED chip and by measuring a record start position of the recorded straight-line image, but the present invention is not limited to the same. For example, such data may be obtained by directly measuring mounted positions of the LED chips.

Further, in the present embodiment, there was also described a case which corresponds to positional errors of the LED chips provided along the sub-scan direction, but the present invention is not limited to the same and may be applied to a case which corresponds to positional errors of the LED chips provided along the main scanning direction. In this case, it suffices that, with the positional errors of the LED chips mounted in the main scanning direction being measured in advance, the timing at which the LED chip is caused to emit light is displaced by a time corresponding to the measured positional error of the mounted LED chip.

Moreover, in the present embodiment, there was described a case in which the timing at which the analog switch $40_n$ is turned on in the period SH2 is set such that, with the timing at which the analog switch $40_n$ corresponding to an LED chip mounted at a correct position is switched on being set as the reference, the timing at which analog switches $40_n$ corresponding to other LED chips that the above is delayed or advanced. However, the present invention is not limited to the same. For example, with the timing at which an analog switch $40_n$ corresponding to an LED chip which first reaches a predetermined exposure position during exposure is switched on being set as the reference, the timing at which analog switches $40_n$ corresponding to other LED chips than the above are switched on may all be delayed.

Still further, in the foregoing, the data which indicate positional errors of the mounted LED chips 208 are stored in a space area of the LUT 12 in which a conversion table of image data is stored, but the present invention is not limited to the same. For example, such data may also be stored in storage means which is provided in addition to the LUT 12.

Moreover, in the foregoing, the present invention is applied to a multi-channel DA converter formed by two stages of sample-and-hold circuits, but the present invention is not limited to the same. For example, the present invention may also be applied to any circuit for generating drive current for a plurality of light emitting elements which are required to be turned on simultaneously.

According to the present invention, the timing at which a plurality of light emitting elements are caused to emit light is determined for each of the light emitting elements so that exposure positions formed by the light emitting elements are arranged on the same line along a predetermined direction, and therefore, deterioration in image quality caused by positional errors of mounted light emitting elements can be prevented.

What is claimed is:

1. An exposure device comprising:

a light source portion in which a plurality of light emitting elements are mounted along a predetermined direction and which is moved in a direction perpendicular to the predetermined direction during exposure;

storage means which stores values corresponding to positional errors of the plurality of mounted light emitting elements in the direction perpendicular to the predetermined direction; and determination means which determines, based on the values corresponding to the positional errors stored in said storage means, a timing at which the plurality of light emitting elements are caused to emit light for each of the light emitting elements so that exposure positions obtained by the plurality of light emitting elements are arranged on the same line along the predetermined direction.

2. An exposure device according to claim 1, wherein said storage means stores values corresponding to positional errors of the plurality of mounted light emitting elements in the predetermined direction.

3. An exposure device according to claim 1, further comprising:

measurement means for measuring positional errors of the mounted light emitting elements.

4. An exposure device according to claim 3, wherein said measurement means measures an amount of displacement of a record start position of a straight-line image which is transferred by heat-development onto an image receiving paper.

5. An exposure device according to claim 3, wherein said measurement means facilitates measurement of positional errors by emitting light from a single light emitting element at one main scan to form a straight-line image, and by moving a photosensitive material by a small amount in a sub-scan direction for each of the light emitting elements each time one main scan is completed to increase a distance between straight-line images recorded by the light emitting elements.

6. An exposure device according to claim 1, wherein said storage means said storage means stores data indicating a positional error corresponding to directly measured values of a mounting position of each light emitting element.

7. An exposure device according to claim 1, wherein said light source portion comprises an arrangement of light emitting elements in which the number of the light emitting elements are set at an odd number so that main scanning line pitch numbers are set at an even number, and a main scanning line is additionally formed between adjacent main scanning lines so as to double the resolution, and to make a sub-scan pitch uniform.

8. The exposure device according to claim 1, wherein said determination means determines a timing for each of the plurality of light emitting elements independently of the other of the plurality of light emitting elements.

9. An exposure device comprising:

a light source portion in which a plurality of light emitting elements are mounted along a predetermined direction and which is moved in a direction perpendicular to the predetermined direction during exposure;

storage means which stores values corresponding to positional errors of the plurality of mounted light emitting elements in the direction perpendicular to the predetermined direction;

determination means which determines, based on the values corresponding to the positional errors stored in said storage means, a timing at which the plurality of light emitting elements are caused to emit light for each of the light emitting elements so that exposure positions obtained by the plurality of light emitting elements are arranged on the same line along the predetermined direction; and wherein said determination means for determining the timing at which the plurality of light emitting elements are caused to emit light sets, as a reference, a timing at which an analog switch corresponding to a light emitting element which reaches a predetermined exposure position at first is switched on.

10. An exposure device comprising:

a light source portion in which a plurality of light emitting elements are mounted along a predetermined direction and which is moved in a direction perpendicular to the predetermined direction during exposure;

storage means which stores values corresponding to positional errors of the plurality of mounted light emitting elements in the direction perpendicular to the predetermined direction;

determination means which determines, based on the values corresponding to the positional errors stored in said storage means, a timing at which the plurality of light emitting elements are caused to emit light for each of the light emitting elements so that exposure positions obtained by the plurality of light emitting elements are arranged on the same line along the predetermined direction; and wherein said determination means for determining the timing at which the plurality of light emitting elements are caused to emit light sets, as a reference, a timing at which an analog switch corresponding to a light emitting element mounted as a correct position is switched on.

11. An exposure method comprising the steps of:

storing in advance values corresponding to positional errors of a plurality of light emitting elements, which are mounted in a light source portion along a predetermined direction, the light source portion being operable to move in a direction perpendicular to the predetermined direction during exposure; and based on the values corresponding to the positional errors and stored in advance, determining, for each of the plurality of light emitting elements, a timing at which the plurality of light emitting elements are caused to emit light so that exposure positions obtained by the plurality of light emitting elements are arranged on the same line along the predetermined direction.

12. An exposure method according to claim 11, wherein said storing further comprises storing values corresponding to positional errors of the plurality of mounted light emitting elements in the predetermined direction.

13. An exposure method according to claim 11, further comprising the step of:

measuring positional errors of the mounted light emitting elements.

14. An exposure method according to claim 13, wherein said step of measuring positional errors comprises measuring an amount of displacement of a record start position of a straight-line image which is transferred by heat-development onto an image receiving paper.

15. An exposure method according to claim 13, wherein said measuring step facilitates measurement of positional errors by emitting light from a single light emitting element at one main scan to form a straight-line image, and by moving a photosensitive material by a small amount in a sub-scan direction for each of the light emitting elements each time one main scan is completed to increase a distance between straight-line images recorded by the light emitting elements.

16. An exposure method according to claim 11, further comprising directly measuring the mounted position of each light emitting element to determine the values corresponding to positional errors of the plurality of light emitting elements.

17. An exposure method according to claim 11, wherein said light source portion comprises an arrangement of light emitting elements in which the number of the light emitting elements are set at an odd number so that main scanning line pitch numbers are set at an even number, and a main scanning line is additionally formed between adjacent main scanning lines so as to double the resolution, and to make a sub-scan pitch uniform.

18. The exposure method of claim 11, wherein in determining a timing at which the plurality of light emitting elements are caused to emit light, the timing of each of the plurality of light emitting elements is determined independently from the other of the plurality of light emitting elements.

19. An exposure method comprising the steps of:

storing in advance values corresponding to positional errors of a plurality of light emitting elements, which are mounted in a light source portion along a predetermined direction, the light source portion being operable to move in a direction perpendicular to the predetermined direction during exposure;

based on the values corresponding to the positional errors and stored in advance, determining, for each of the plurality of light emitting elements, a timing at which the plurality of light emitting elements are caused to emit light so that exposure positions obtained by the plurality of light emitting elements are arranged on the same line along the predetermined direction; and wherein said determining step comprises setting a reference time at which the plurality of light emitting elements are caused to emit light, said reference time corresponding to a time at which an analog switch corresponding to a light emitting element which reaches a predetermined exposure position at first is switched on.

20. An exposure method comprising the steps of:

storing in advance values corresponding to positional errors of a plurality of light emitting elements, which are mounted in a light source portion along a predetermined direction, the light source portion being operable to move in a direction perpendicular to the predetermined direction during exposure;

based on the values corresponding to the positional errors and stored in advance, determining, for each of the plurality of light emitting elements, a timing at which the plurality of light emitting elements are caused to emit light so that exposure positions obtained by the plurality of light emitting elements are arranged on the same line along the predetermined direction; and wherein said determining step comprises setting a reference time at which the plurality of light emitting elements are caused to emit light, said reference time corresponding to a time at which an analog switch corresponding to a light emitting element mounted at a correct position is switched on.

21. An exposure device comprising:

a plurality of light emitting elements mounted along a predetermined direction;

a transport device operable to move said plurality of light emitting elements in a direction perpendicular to the predetermined direction during exposure;

a memory which stores values corresponding to positional errors of the plurality of light emitting elements in the direction perpendicular to the predetermined direction;

a timing circuit receiving data from said memory to activate lights in the plurality of light emitting elements according to said positional errors so that exposure positions obtained by the plurality of light emitting elements are arranged on a common line along the predetermined direction.

22. An exposure device according to claim 21, wherein said timing circuit activates first and second switches to activate lights in the plurality of light emitting elements so that exposure positions obtained by the plurality of light emitting elements are arranged on a common line along the predetermined direction.

* * * * *